Aug. 6, 1929.                M. CASTRICUM                1,723,501
              APPARATUS FOR FORMING WEFTLESS CORD FABRIC
                          Filed Oct. 31, 1924
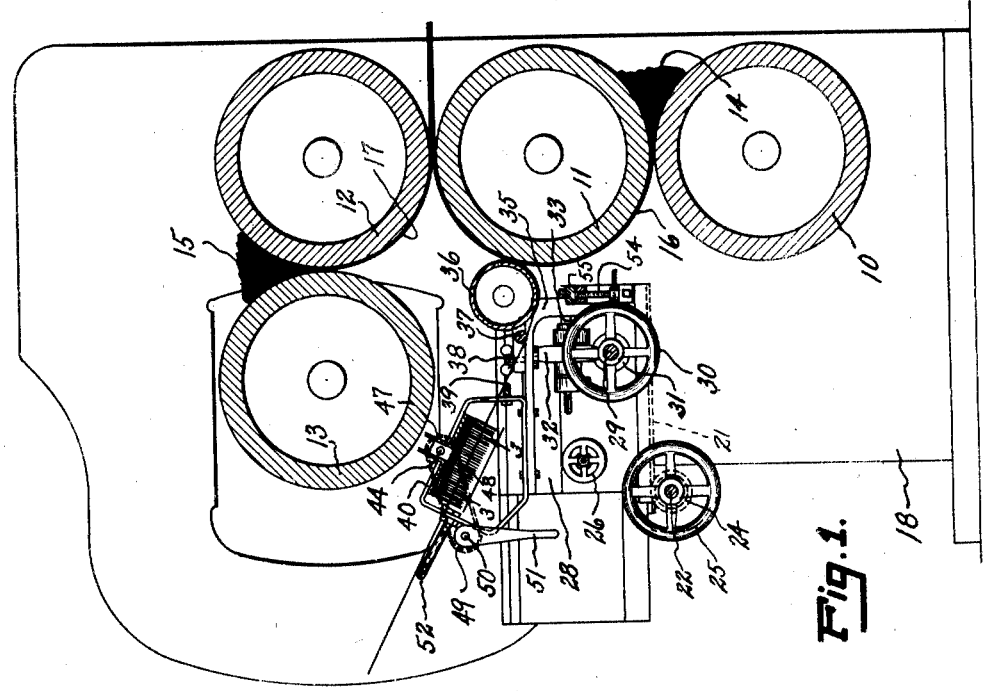
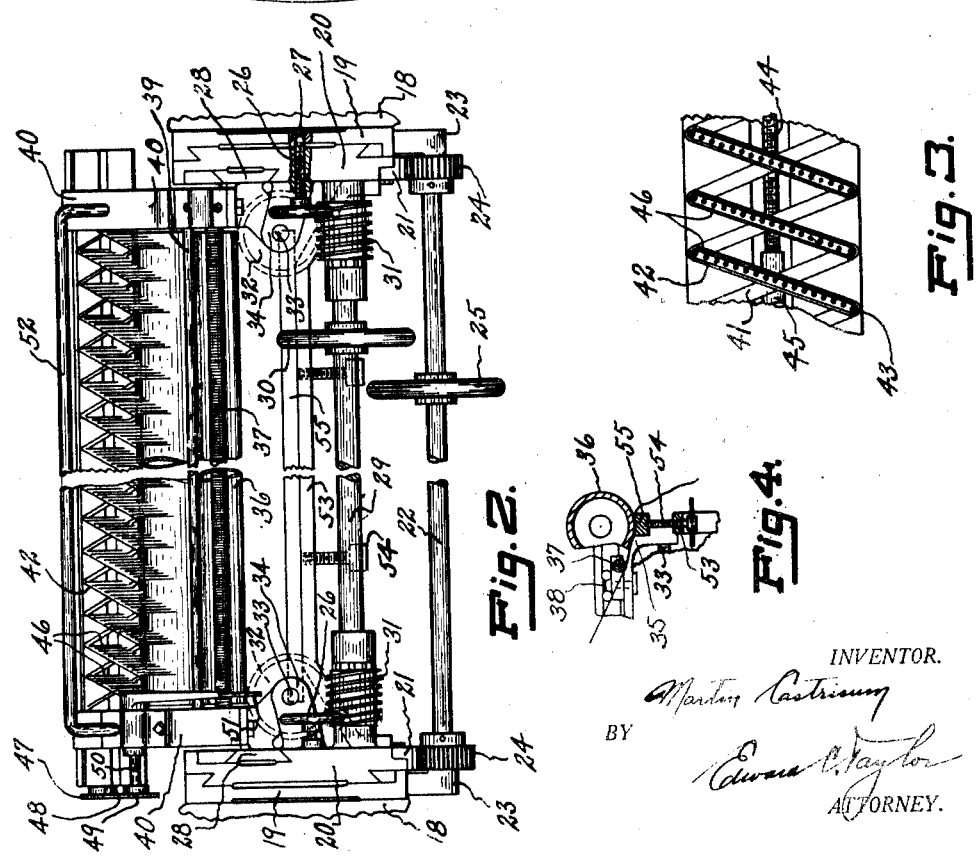
INVENTOR.
Martin Castricum
BY
Edward C. Taylor
ATTORNEY.

Patented Aug. 6, 1929.

1,723,501

UNITED STATES PATENT OFFICE.

MARTIN CASTRICUM, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

APPARATUS FOR FORMING WEFTLESS CORD FABRIC.

Application filed October 31, 1924. Serial No. 746,984.

This invention relates to apparatus for making weftless cord fabric, i. e., sheet material formed of a plurality of parallel cords embedded in a matrix of rubber, and has for a particular object the provision of an apparatus of this kind which is adapted for use with a standard four-roll calender of the type having the top roll offset. The apparatus is not, however, restricted to use on calenders of this type.

Referring to the drawings,

Fig. 1 is a side elevation of the apparatus, one side of the calender frame being removed and the calender rolls being shown in section;

Fig. 2 is a front elevation of the cord guiding means shown in Fig. 1, taken from the left in that figure;

Fig. 3 is a detail of a cord guiding comb, taken on line 3—3 of Fig. 1; and

Fig. 4 is a detail section of a cord gripping device, with the parts in a different operative position from that shown in Fig. 1.

In the making of weftless cord fabric by the calendering process it has been proposed, as for example in my prior Patents 1,500,232 and 1,500,234, to guide the cords by a suitable spacing device to a roll which presses against one roll of a usual rubber sheeting calender. The same general method is followed in this case, the changes made being for the purposes of adapting the guiding device to a four-roll calender, of increasing the accuracy with which the cords are spaced, of increasing the accessibility of the cords so that errors and breaks may be more easily corrected, and of quickening the speed with which the guiding device can be put in or taken out of operation.

The spacing device has been shown in the drawings as associated with a four-roll calender, rolls 10, 11, and 12 of which are arranged in vertical stack formation, while roll 13 is at the side of roll 12. The two feeds of rubber are shown at 14 and 15, forming sheets 16 and 17 respectively. The calender rolls, as well as the guiding and spacing devices to be described, are supported on a frame 18.

In slide-ways 19 on the calender frame are mounted slides 20, each slide carrying at its bottom a rack 21. A shaft 22, extending between bearings 23 on the slideways 19, carries pinions 24 meshing with racks 21 and also carries a handwheel 25. By turning the handwheel the slides can be moved simultaneously towards or away from the calender unless the slides are locked. Such locking is accomplished by screw dowels 26, one threaded into each slide 20 and fitting into a hole 27 in the neighboring slideway.

On each slide 20 are guides receiving a second slide 28 upon which the cord guiding devices are mounted. A shaft 29 extends between bearings on the slides 20, carrying a handwheel 30 and worms 31. These worms each mesh with a wormwheel 32 on a short shaft 33 rotatable in brackets 34 attached to slides 20 but fixed against endwise movement in them. One end of each shaft is threaded into a depending lug 35 attached to slide 28. By rotating the handwheel 30 the short shafts 33 can be rotated simultaneously, causing the slides 28 to be moved backwards or forwards on slides 20. As contrasted with the quick movement accomplished through turning handwheel 25, the train of mechanism controlled by handwheel 30 produces a slow movement. The first is used for placing the guiding devices in or out of operative relation with the calender, the second for varying the pressure with which the cord supplying roller 36 is forced against the calender roll 11.

The cord supplying roller 36 is mounted in bearings at the forward end of slides 28. Directly back of this roller is a rod 37, held against rotation in the slides by clamps 38 and screw-threaded over its entire effective length on a pitch corresponding to the spacing desired for the cords. The function of this rod is to insure absolute accuracy in the cord spacing at the last moment before the cords reach the smooth-surfaced roll 36; while, owing to the simplicity and cheapness of the rod owing to the use of screw threading rather than circumferential grooving, and to the readiness with which the rod may be removed and replaced, adjustments for different cord spacings can be made quickly. The rod being stationary it is feasible to use screw-threading instead of a succession of circumferential grooves, the latter type of construction being required where the cords are guided over a roller having spacing grooves on its surface. In order to hold the cords in contact with rod 37 a bail or rod 39 is preferably employed, being fastened to brackets 40 attached to the top of the slide.

The major part of the spacing of the cords is done by the comb 41 attached to bracket 40.

This comb may be of any suitable type, but to facilitate adjustments I prefer to make it of the lazy-tongs type having teeth only on those bars of the tongs extending in the same direction. A small portion of the comb is illustrated in Fig. 3. It is composed of sets of bars 41 and 42, pivoted together at their ends 43. A rod 44 runs from end to end of the comb structure and has on either side of the center threaded portions of opposite hand. Preferably there are a plurality of these threaded portions at each side with different pitches, chosen to correspond with the movement which should be imparted to spaced control points on the lazy-tongs. At intervals along the comb nuts 45 are attached to bars 41, being threaded over the rod. The teeth 46 of the comb are shown as being attached to bars 42. This type of comb is described, with some refinements not necessary to go into here, in my prior application Serial No. 720,194, which has matured into Patent No. 1,531,689, dated March 31, 1925.

At the end of rod 44 is a sprocket 47, connected by a chain 48 with a sprocket 49 on a short shaft 50. Mounted on this shaft is a ratchet mechanism of any standard type, shown as provided with a handle 51. A handwheel could of course be used, but the construction described affords less interference with the room necessary for the cords. A rod or bail 52 guides the cords into proper relation with the comb.

When the production of fabric is to be stopped it is necessary to secure the ends of the cords in some manner. It has been proposed to tie the cords at this time around some support, and while this will work satisfactorily, as has been proved in practice, I have devised a very desirable refinement for use in this part of the operation. Extending between the lugs 35 is a bar 53 threaded to receive screws 54 which support at their upper ends a clamping piece 55. By turning the screws, or by the use of any equivalent device, the clamp may be elevated to hold the cords firmly against roller 36. If the cords are thus clamped before they are cut, while they are still under tension and properly spaced, they will be held in this condition as long as it is desirable to have the calendar remain idle in the making of weftless fabric. This clamping will also be effective whatever the position of the slides 20 and 28. Sagging of the cords out of the teeth of the comb when the cords are clamped as described and the guiding device backed away from the calender is prevented by bails 39 and 52.

Having thus described my invention, I claim:

1. A cord guiding device for use in the manufacture of weftless cord fabric, comprising means for supporting a rubber sheet, a smooth surfaced roll positioned adjacent such means, a rod fixed against rotation adjacent the roll and screw threaded throughout its effective cord guiding length, and means for directing a sheet of parallel cords over the surface of the fixed rod, whereby the cords are arranged in accurately spaced relation by the fixed rod and delivered in such relation to the rubber sheet by the roll.

2. A cord guiding device of the type in which a sheet of parallel cords are positioned against a rubber sheet by a rotatable roll, characterized by a rod screw threaded throughout its effective cord guiding length and fixed against rotation in the path of the cords prior to their contact with the roll.

3. A cord guiding device over which a sheet of cords can be drawn to arrange the cords in accurately spaced position comprising a rod screw threaded throughout its effective cord guiding length and fixed against rotation.

4. Apparatus for use in the manufacture of weftless cord fabric comprising a four roll calender having its top roll offset, the outer pairs of rolls forming rubber sheets and the central pair pressing the two sheets together, a roll underlying the offset roll and contacting with the sheet of rubber on the lower of the central pair of calender rolls, and a comb mounted with its open side downward and in a position to receive and guide cords traveling in a path slanting downwardly towards the said underlying roll.

MARTIN CASTRICUM.